US010589911B2

(12) United States Patent
Gudenburr et al.

(10) Patent No.: US 10,589,911 B2
(45) Date of Patent: Mar. 17, 2020

(54) ANGLE PLATE PACKAGE HAVING A SINGLE STRAP

(71) Applicant: Ductmate Industries, Inc., Charleroi, PA (US)

(72) Inventors: Douglas Gudenburr, Finleyville, PA (US); Duane Fetko, Mastontown, PA (US)

(73) Assignee: Ductmate Industries, Inc., Charleroi, PA (US)

( * ) Notice: Subject to any disclaimer, the term of this patent is extended or adjusted under 35 U.S.C. 154(b) by 8 days.

(21) Appl. No.: 15/944,548

(22) Filed: Apr. 3, 2018

(65) Prior Publication Data

US 2019/0300250 A1 Oct. 3, 2019

(51) Int. Cl.
| *B65D 63/10* | (2006.01) |
| *B65D 71/50* | (2006.01) |
| *F16L 23/14* | (2006.01) |
| *F24F 13/02* | (2006.01) |
| *B65D 85/62* | (2006.01) |

(52) U.S. Cl.
CPC ............ *B65D 63/10* (2013.01); *B65D 71/50* (2013.01); *B65D 85/62* (2013.01); *F16L 23/14* (2013.01); *F24F 13/0209* (2013.01)

(58) Field of Classification Search
CPC ........ B65D 63/10; B65D 71/50; B65D 85/62; B65D 71/02; F16L 23/14; F24F 13/0209
USPC ........ 206/499, 451, 83.5, 321, 338; 285/405
See application file for complete search history.

(56) References Cited

U.S. PATENT DOCUMENTS

| 3,712,650 | A | | 1/1973 | Mez |
| 4,466,641 | A | | 8/1984 | Heilman et al. |
| 5,342,100 | A | | 8/1994 | Goodhue |
| 5,568,862 | A | * | 10/1996 | Black, Jr. ............... B65D 69/00 206/338 |
| 5,621,956 | A | * | 4/1997 | Kolesar ................... F16L 23/14 29/243.5 |
| 6,047,466 | A | * | 4/2000 | Karpman ................ B23P 19/04 19/4 |

(Continued)

FOREIGN PATENT DOCUMENTS

AU 2016204598 A1 7/2016

OTHER PUBLICATIONS

IP Australia; Examination Report No. 1 for Standard Patent Application; Examination Report No. 1 for Standard Patent Application from IP Australia Application No. 2019202183; pp. 1-5: publisher IP Australia; published Canberra, Australia; dated Jul. 31, 2019; (5 pages).

*Primary Examiner* — Chun Hoi Cheung
(74) *Attorney, Agent, or Firm* — Metz Lewis Brodman Must O'Keefe LLC

(57) ABSTRACT

A stacked package of angle plates for use in association with a device for assembling individual ones of said angle plates into receptive flanges of HVAC duct sections is disclosed. A strap zone is defined as a portion of the stacked package located proximate to the apex of each of the angle plates, preferably from the apex to a point approximately 25% along the length of each of the legs. A single tensioned strap is placed extending around each of the angle plates in the stacked package and is located within the strap zone. The strap exerts a sufficient amount of tension to restrain each of the angle plates within the stacked package, and is preferably four foot-pounds.

22 Claims, 3 Drawing Sheets

(56) References Cited

U.S. PATENT DOCUMENTS

| | | | |
|---|---|---|---|
| 6,428,056 B1 * | 8/2002 | Issagholian-Havai | B21C 37/16 285/182 |
| 7,013,545 B1 | 3/2006 | Ritchie | |
| 8,652,609 B2 * | 2/2014 | Gass | F24F 13/0209 285/405 |
| 8,875,388 B1 | 11/2014 | Daw et al. | |
| 8,959,755 B2 | 2/2015 | Daw et al. | |
| 9,027,376 B2 | 5/2015 | Daw et al. | |
| 9,151,513 B1 | 10/2015 | Daw et al. | |
| 9,157,653 B2 | 10/2015 | Daw et al. | |
| 9,377,213 B2 | 6/2016 | Daw et al. | |
| 9,545,695 B2 | 1/2017 | Daw et al. | |
| 2008/0210139 A1 * | 9/2008 | Watanabe | B65D 63/1009 108/55.5 |
| 2015/0369512 A1 | 12/2015 | Daw et al. | |
| 2016/0297040 A1 | 10/2016 | Daw et al. | |

* cited by examiner

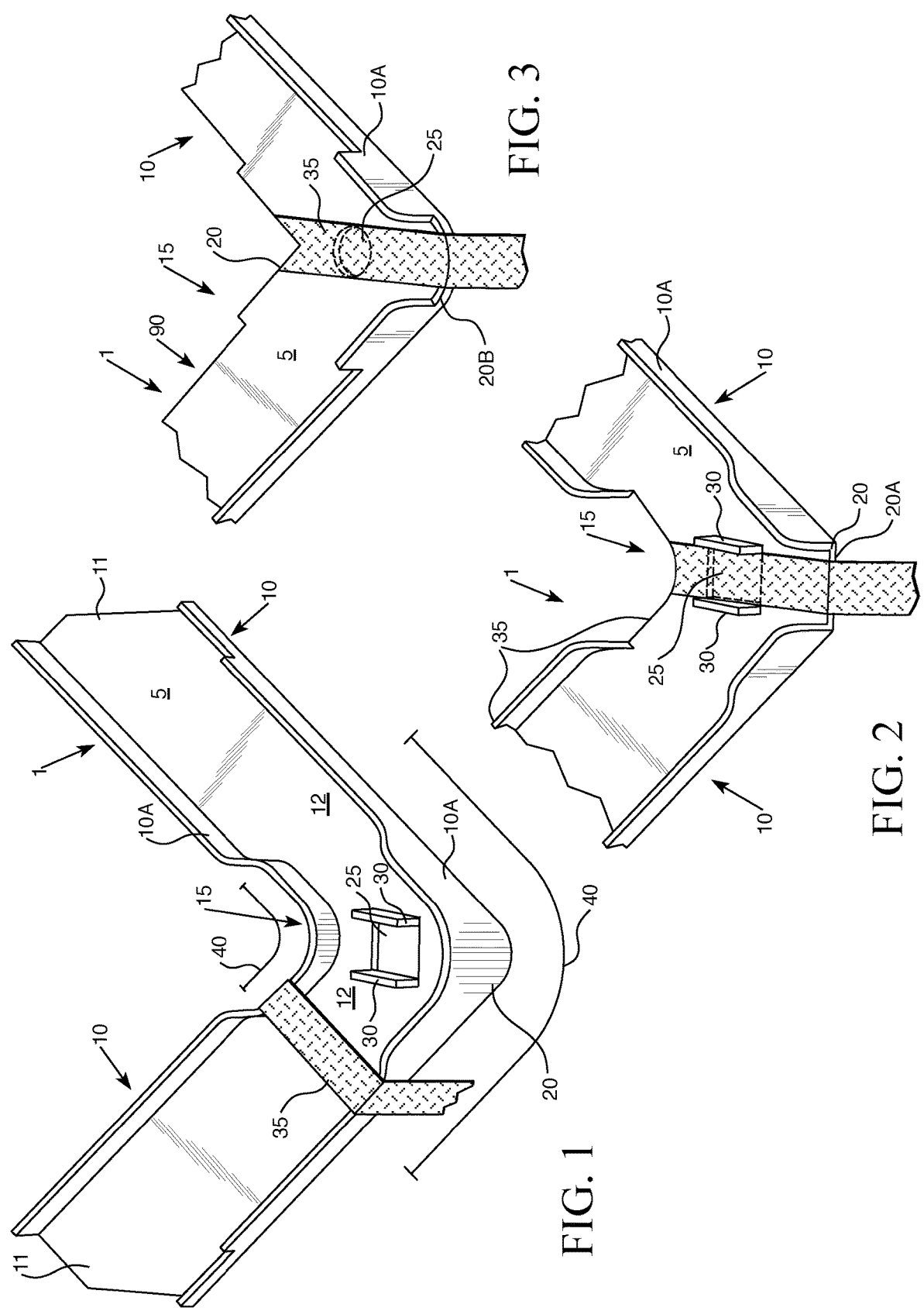

ANGLE PLATE PACKAGE HAVING A SINGLE STRAP

FIELD OF THE INVENTION

The present invention relates generally to the binding of angle plates into packages of forty or less pieces. More particularly, it relates to utilization of a single tensioned strap to bind the angle plates into a uniform package.

BACKGROUND

Angle plates are commonly utilized to form rigid, connectable corners in HVAC ducting. Each duct is provided with a channel flange at one or more ends at the corners of a generally rectangular section. The angle plates are placed in the channel at the corners of opposing flanges of opposing duct sections and are bolted or clipped together, forming a joined section of ductwork. The process of insertion of the angle plates into the flanges, as well as the general design of the angle plates are more fully described in Daw, et al., U.S. Pat. Nos. 9,377,213; 9,545,695 and United States Patent Application Publication No. 2016/0297040.

Angle plates are well known in the field of HVAC duct connection. Each are generally right angular, having two leg portions joined at an apex. In early embodiments, as exemplified in Mez, U.S. Pat. No. 3,712,650, the angle plates were inserted longitudinally into a preformed cavity perimetrically located at the leading edge of a duct flange. This is illustrated in FIGS. 1 and 2 of Mez. The angle plate is manually inserted into each of the perpendicularly located adjacent cavities at each corner of the generally rectangular duct by the corresponding leg portions. A bolt hole is provided at the apex of the angle plate to facilitate the joining of two duct sections at each corner by passing a bolt or other fastener through a first angle plate bolt hole to a corresponding angle plate bolt hole affixed to the second duct section.

Later improvements in the art of duct flange joinder included the development of automated angle plate insertion devices, as exemplified in Goodhue, U.S. Pat. No. 5,342,100. Goodhue discloses an angle plate and a device for installing angle plates in the corners of HVAC ducts. The angle plates so described are configured so as to be automatically fed to the installation device through a supply hopper and a stack of angle plates is inserted in the hopper for such automatic feeding. This is best illustrated in FIGS. 9 and 15 of Goodhue.

Originally, angle plates were manually assembled into stacks and placed into the supply hopper. Various tools, both commercial and improvised, were developed to assist in the organization and stacking of the angle plates to improve efficiency in unpacking and loading the angle plates. Many of these incorporated the use of the bolt holes in the angle plates and elongated prongs to assemble stacks. However, rotation of the angle plates about the prong axis still required significant manipulation of the angle plates by hand, decreasing efficiency. In light of the need to continuously fill the supply hopper of such automated installation devices and the limitations of manual stacking, a number of embodiments of prepackaged angle plate stacks have been proposed.

Prepackaged stacks of angle plates must incorporate at least two design limitations. They must resist rotation and lateral displacement of the angle plates relative to each other in the stack and must facilitate easy insertion of the angle plates into the supply hopper and removal of the packaging without disturbance.

Initially, a cardboard sleeve was proposed in Daw, et al., U.S. Pat. No. 9,027,376, in which the angle plates were loaded in stacks of preselected amounts. The sleeve, as illustrated in FIGS. 5 and 6 of Daw, was sized to conform to the right-angle perimeter of the angle plates and incorporated a lid which facilitated the removal of the sleeve from the angle plates once in the supply hopper was loaded. The sleeve was also adapted to fit within the confines of the supply hopper prior to unloading.

A more common embodiment of the sleeve stack incorporates plastic or other straps extending longitudinally along the stack length. Use of the straps, rather than the box packaging is simpler and more economical. Use of straps is exemplified in Daw, et al., U.S. Pat. No. 9,545,695. FIGS. 18-19A, inclusive, illustrate several embodiments which include a variety of straps and conformations. Notably, FIG. 18 includes two straps, one on each leg portion, while FIG. 18A illustrates four straps, two on each leg portion. FIG. 19 illustrates the use of a single strap spanning both leg portions and forming a hypotenuse of a right triangle with the leg portions of the angle plates.

Commercial use of the various package and strap embodiments has identified certain limitations in the assembly and maintenance of the stacked angle plates. Many embodiments of the supply hopper are enclosed, at least partially, reducing visibility of the angle plates therein. Moreover, access to the straps may be obstructed by the hopper side walls and supports, making removal of the straps difficult. Many hopper embodiments, however, include an open area at the apex of the stack of angle plates. The only known single strap embodiment, as illustrated in FIG. 19 of Daw '695, has proved to be unstable with respect to consistent transport, loading and unloading of stacks with respect to bulk packaging and insertion into the assembly devices.

What is lacking in the art is a single strap embodiment which provides appropriate resistance to rotational and lateral movement of the plates, while facilitating easy removal while in the supply hopper. The development of alternative one-strap embodiments has proven to be more challenging that mere optimization of the parameters for assembling an angle plate stack, as rotational and lateral forces typically cause unintentional spontaneous collapse of the stack absent a particular assembly structure.

SUMMARY OF THE INVENTION

A stacked package of angle plates for use in association with a device for assembling individual ones of said angle plates into receptive flanges of HVAC duct sections is disclosed. A plurality of angle plates, each having two legs joined at an apex forming a right angle, form the stacked package. In the preferred embodiment, the legs of each of the angle plates within the stacked package are substantially aligned with all other ones of the angle plates within the stacked package.

A strap zone is defined as a portion of the stacked package located proximate to the apex of each of the angle plates, preferably from the apex to a point approximately 25% along the length of each of the legs. In the commercial embodiment, which is typically a four-inch angle plate, the strap zone would extend about one inch down each leg from the apex. A single tensioned strap is placed extending around each of the angle plates in the stacked package and is located within the strap zone. The use of a single strap creates less packaging waste and increases efficiency of use, by reducing load, insertion and unpacking time. Preferably the strap exerts a sufficient amount of tension to restrain each of the angle plates within the stacked package. This amount of tension is disclosed for the preferred embodiments as a preselected quantity, but can be adjusted by one skilled in the art for other embodiments. This tension facilitates the handling of the stacked package of angle plates as a unified whole for insertion within the supply hopper of the duct assembly device.

In embodiments, the stacked package of angle plates utilizes the strap to restrain lateral and rotational displacement the angle plates within the stacked package with respect to each other, either individually or in groups. In the preferred embodiment, the combination of the tension of the strap and its location within the strap zone restrains the lateral and/or rotational displacement of individual ones of the angle plates with respect to each other.

The angle plates may further comprise portions of a raised perimeter along at least one or both of the legs and proximate to the corner and apex. These raised perimeter sections may be continuous or discontinuous and if discontinuous, may form a recess at the apex of each of the angle plates in the stack. In certain embodiments, the recess is formed at the corner of each of said angle plates. These recesses may be formed as flat or angular, depending on the application. In the preferred embodiment, a flat recess is located on the external perimeter of each of the angle plates at the apex and receives and supports the strap along its surface. In embodiments, each angle plate may further comprise a plurality of projections proximate to the apex which form a space which receives and restrains the strap from lateral movement along the legs. The flat recess may also be aligned with the projections and combine to receive and restrain the strap at the apex of each angle plate. In embodiments, the strap may be preferably located at the apex of the angle plates, but may be displaced at any point within the strap zone.

It should be noted that the one or more of the projections and the raised perimeter of each of the angle plates retards nesting of the angle plates.

While embodiments up to 80 angle plates are possible, each package is preferably 40 or less angle plates, with additional preferred embodiments having 25. These sizes are intended to create packages of lesser weight for easier handling. In embodiments, including the preferred embodiments, the strap exerts a tensioning force of 4 foot-pounds on the package of angle plates. As stated, this amount of tension is disclosed for the preferred embodiments as a preselected quantity, but can be adjusted by one skilled in the art for other embodiments.

In embodiments, the strap is preferably comprised of plastic material which resists stretching.

These and other advantages and features of the present invention will be more fully understood with reference to the presently preferred embodiments thereof and to the appended drawings.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figures, in which:

FIG. 1 is an isometric view of a generic angle plate located at the top of an unspecified stack of angle plates in a first embodiment having an affixation strap in a first location.

FIG. 2 is an isometric view of a portion of a second embodiment of an angle plate having a flat recess at its apex and a second embodiment of a stack having an affixation strap in a second location.

FIG. 3 is an isometric view of a portion of a third embodiment of an angle plate having an angular recess at its apex in the second embodiment of the stack having the affixation strap in the second location.

Figure 4:
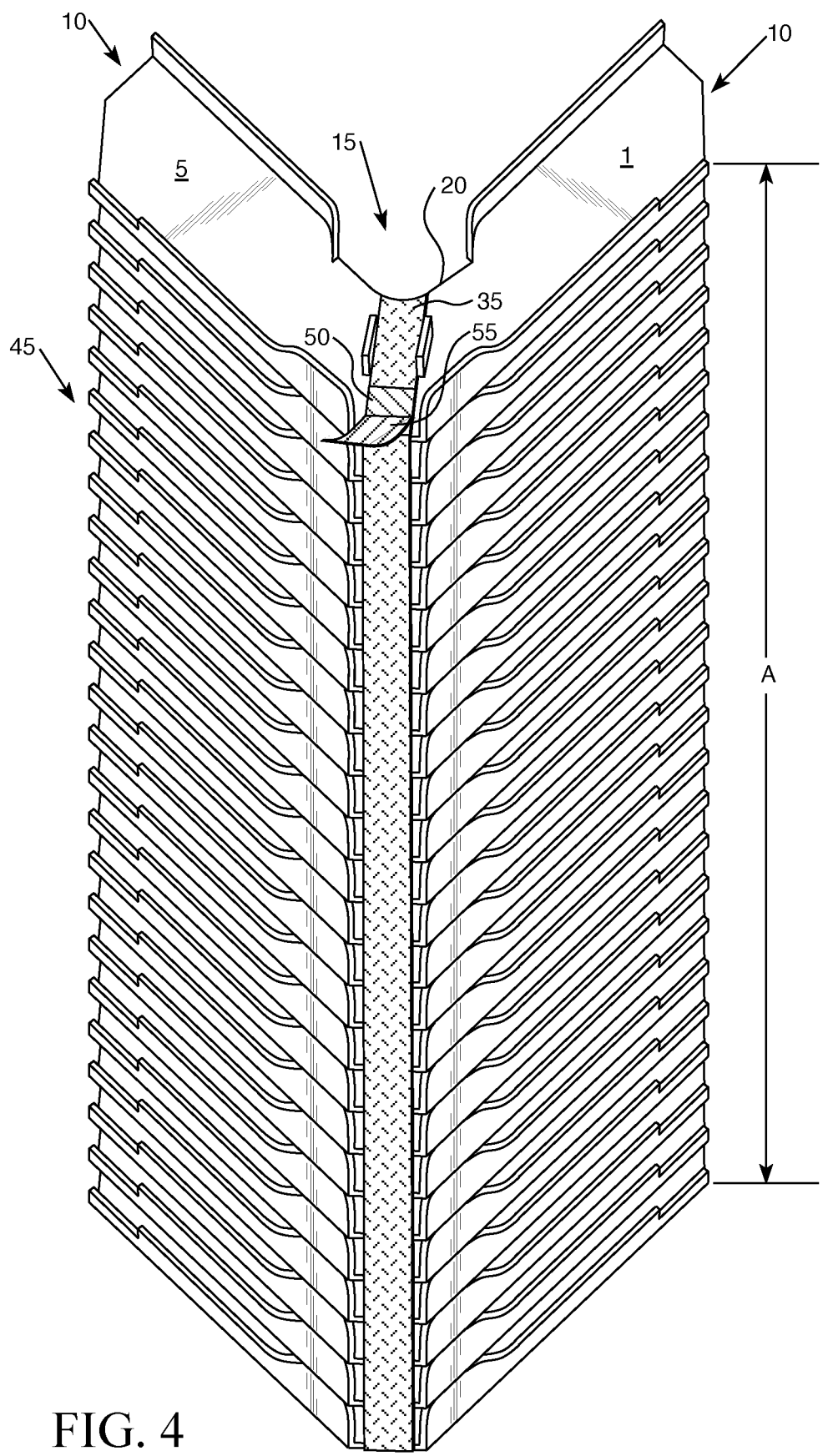
FIG. 4 is an isometric view of a stack of angle plates in the second embodiment of the stack having the affixation strap in the second location.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

Referring now to FIG. 1, angle plate 1 is illustrated in a generally right-angle orientation having a body 5 which further comprises a plurality, and preferably two leg portions or legs 10. Legs 10 each include a proximal end 12 and distal end 11 and are conjoined at their respective proximal ends 12 to form a corner 15. It should be noted that angle plate 1 may also be generically referenced as a "corner," separate and distinct from the specific corner 15 location. Corner 15 further comprises an external endpoint forming apex 20 of angle plate 1.

It should be noted and those skilled in the art will recognize that legs 10 and corner 15, including apex 20 may selectively be provided with a raised perimeter 10A along all or a portion of the perimeter of angle plate 1. Raised perimeter 10A may be contiguous or interrupted at any point and such arrangement of raised perimeter 10A is entirely independent of any other feature of the embodiments described herein, subject only to the particular application to which angle plate 1 is applied. Furthermore, the perimeter of angle plate 1 itself may be notched, cut, bent, rounded or otherwise expanded or constricted in any form or orientation as necessitated by the application requirements. As particularly illustrated as one embodiment of angle plate 1 in FIG. 1, legs 10 are truncated by a diagonally relieved section at the distal end 11 and corner 15 is defined on the interior perimeter by a relieved section. Raised perimeter 10A is contiguous along the majority of the interior perimeter of angle plate 1 while only present proximate to apex 20 on the exterior perimeter of angle plate 1. Further relevant refinements of the location and continuity of raised perimeter 10A will be discussed in more detail with respect to other figures.

Each angle plate 1 is preferably provided with at least one hole 25 for receiving a bolt or other appropriate fastener for the affixation of adjacent duct flanges (not shown) as described above, although boltless, clipped embodiments are possible. The location of at least one hole 25 is preferably at corner 15 and medial to the overall length of angle plate 1, one or more holes 25 may be placed at any location on angle plate 1. Hole 25 may be drilled, punched, pressed, stamped or otherwise applied to angle plate 1, resulting in the creation of flashing or projections 30, as shown in FIG. 1 or without such projections, as shown in FIG. 3. Projections 30 and raised perimeter 10A may be cooperatively or independently utilized to resist nesting of adjacent angle plates 1 in a stack, as will be described more fully below.

Figure 5:
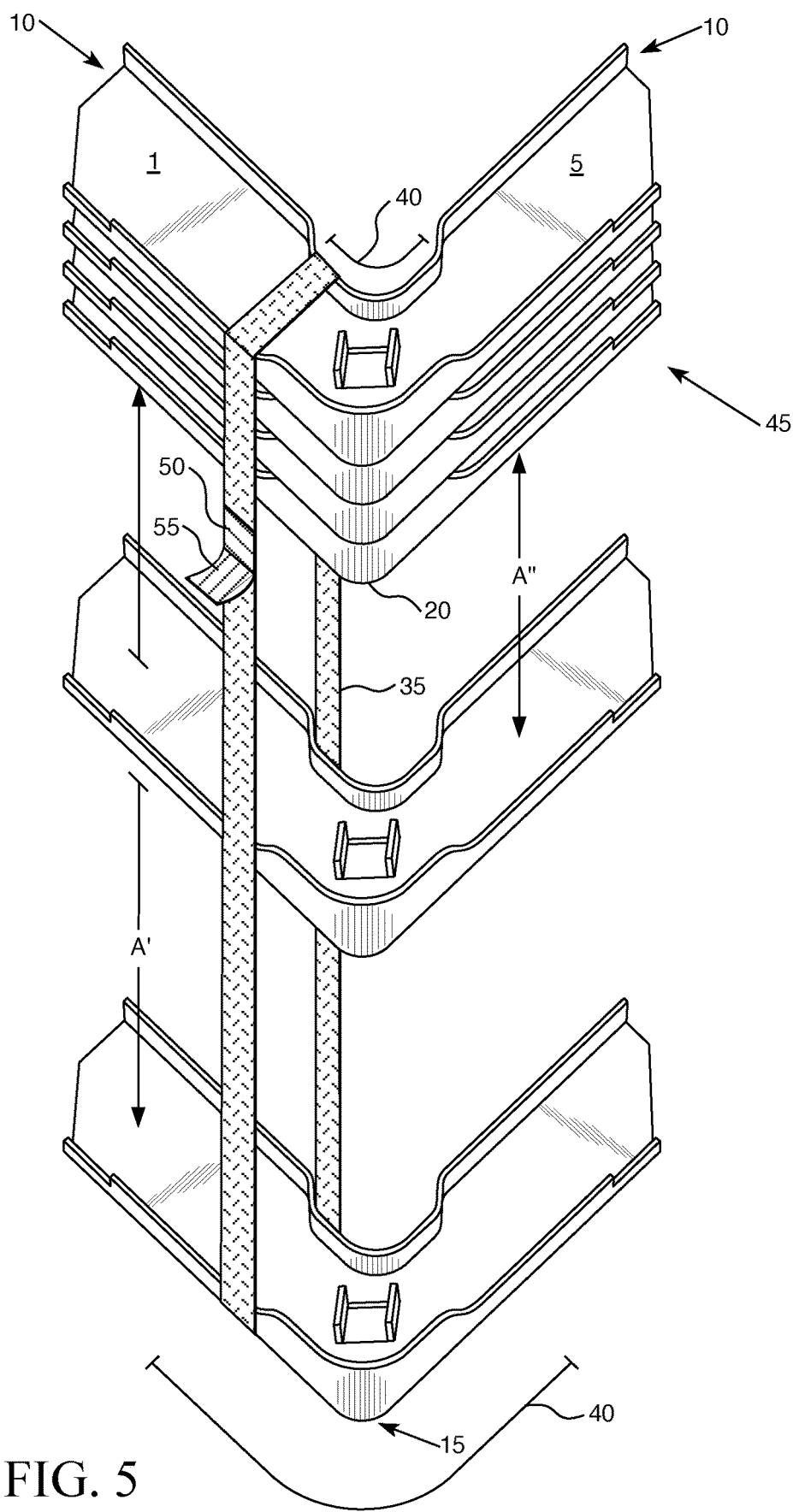
FIG. 5 is a diagrammatic isometric view of a stack of angle plates in the first embodiment of the stack having the affixation strap in the first location.

Referring now to FIGS. 1, 4 and 5, a stack 45 of angle plates 1 is formed by vertically (as illustrated in FIGS. 4 and 5) placing a plurality of angle plates 1 in a coordinated arrangement with all of the legs 10 aligned. Stacks 45 may be formed by any number of angle plates 1, but are preferably in quantities of 25, as illustrated in FIG. 4 as A, up to a maximum of 80, represented in FIG. 5 as A'. A preferred maximum of 40 is illustrated in FIG. 5 as A". It is to be specifically noted that any quantity is appropriate, as determined by the application, and the quantity is unrelated to the particular embodiment of the angle plate 1. Stack 45 is restrained by strap 35 which is preferably affixed in a continuous loop around the angle plates 1 forming stack 45. It is to be specifically noted that while strap 35 may be located at any point along either of legs 10, one feature of the present invention which is believed to be a significant improvement over the prior art is the identification of a strap zone 40, as illustrated in FIGS. 1 and 4. Placement of a single strap 35 about a stack 45 within strap zone 40 provides sufficient structural integrity to stack 45 so as to resist significant and destructive lateral and rotational displacement of individual ones or groups of angle plates 1 within stack 45. It is to be noted that angle plates 1 are fairly commercially standardized with a dimension of each leg of four inches. In a preferred embodiment, strap zone 40 extends 25% along each leg 10 as measured from the center point of apex 20, or one inch on a standard angle plate 1. Strap 35 is preferably constructed of plastic material which resists stretching and is capable of restraining angle plates 1. The plastic material may be heat welded to form weld 50 at one location on the loop, which permits the extension of tab 55 from the weld 50. Exerting a pulling force on tab 55 breaks weld 50 to permit removal of the strap 35 from the stack 45 once inserted into the supply hopper of the device (not shown). The weld 50 and tab 55 may be particularly located at a certain point on the stack 35 to permit easy access to tab 55 by a user after insertion into a supply hopper. The two preferred locations are illustrated as being placed on the top of the stack 35, as shown in FIG. 4 and on the side of the stack 35, as shown in FIG. 5. Depending on the model of the supply hopper, the tab 55 may only be accessible if located in a particular position on the stack 35 once inserted. It is to be specifically noted that strap 35 may be formed of any suitable alternative material, consistent with the physical requirements of restraint of the angle plates 1, as would be known to one skilled in the art.

Location of strap 35 within strap zone 40 may also facilitate removal of strap 35 once inserted into the supply hopper, as access to the stack 35 may be limited by the supply hopper components. Location of the strap 35 within the strap zone 40, which may correspond with an opening in the supply hopper, exposes the strap 35 for more efficient removal from the side of the stack 35.

In addition to the location of strap 35 within strap zone 40, the force exerted by strap 35 on stack 45 is also a feature of the present invention which is believed to be a significant improvement over the prior art. In the preferred embodiment, the combination of the tension of strap 35 and the location of strap 35 within strap zone 40 serve to retard rotational and lateral displacement of individual or groups of angle plates 1 within stack 45. A minimum of four foot-pounds of tension is preferably exerted on stack 45 by strap 35. The quantitative value of such tension is specific to the preferred embodiments illustrated herein. To the extent alternative embodiments incorporating more than 40 angle plates 1 are contemplated, the tension should be increased proportionately.

Referring now to all figures, additional features may be preferably utilized in conjunction with a single strap 35 to restrain stack 45. A recessed corner 15 may be utilized to restrain strap 35 from lateral displacement along legs 10 to a position outside of strap zone 40, as illustrated in FIG. 1. Additionally, strategic placement of reliefs of raised perimeter 10A on one or both of the interior or exterior perimeter of corner 15 adjacent apex 20 will also retard lateral displacement of strap 35 along legs 10 beyond strap zone 40, as illustrated in FIGS. 2 and 3. More particularly, a flat recess 20A, as illustrated in FIG. 2, may be placed directly at the apex 20 and relieve the perimeter of apex 20 to facilitate the passage of strap 35 over the edge of angle plate 1. The placement of flat recess 20A assists in both retarding lateral movement of strap 35 as well as reducing deleterious friction, bending and displacement between the top and bottom angle plate 1 of stack 45 and strap 35. Similarly, angular recess 20B, as illustrated in FIG. 3, also retards lateral movement of strap 35 between the edges of raised perimeter 10A sections. Referring now to FIG. 2, strap 35 may be advantageously placed between projections 30 of hole 25 to further restrain strap 35 from lateral movement.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A stacked package of angle plates for use in association with a device for assembling individual ones of said angle plates into receptive flanges of HVAC duct sections, comprising:

a plurality of angle plates, each having two legs joined at an apex forming a right angle, forming said stacked package whereby said legs of each of said ones of said angle plates within said stacked package are substantially aligned with all other ones of said angle plates within said stacked package;

a strap zone located proximate to said apex of each of said angle plates from said apex to a point 25% along the length of each of said legs;

a single tensioned strap extending around each of said angle plates in said stacked package, said single tensioned strap located within said strap zone and exerting a preselected amount of tension sufficient to restrain each of said individual ones of said angle plates within said stacked package, facilitating the handling of said stacked package of angle plates as a unified whole for insertion within a supply hopper of said device for assembling individual ones of said angle plates into receptive flanges of HVAC duct sections.

2. The stacked package of angle plates as described in claim 1, wherein said single tensioned strap restrains at least one of lateral and rotational displacement of individual ones of said angle plates within said stacked package.

3. The stacked package of angle plates as described in claim 1, wherein the combination of said tension of said single tensioned strap and said location of said strap within said strap zone restrains at least one of lateral and rotational displacement of individual ones of said angle plates within said stacked package.

4. The stacked package of angle plates as described in claim 1, wherein each of said angle plates further comprises a raised perimeter along a portion of at least one of said legs and said corner.

5. The stacked package of angle plates as described in claim 4, wherein said raised perimeter is discontinuous and forms a recess at said apex of each of said angle plates.

6. The stacked package of angle plates as described in claim 5, wherein said recess is formed at a corner of each of said angle plates.

7. The stacked package of angle plates as described in claim 5, wherein said recess is selected from the group consisting of flat and angular.

8. The stacked package of angle plates as described in claim 7, wherein said flat recess is located on an external perimeter of each of said angle plates at said apex and receives said single tensioned strap along a surface of said flat recess.

9. The stacked package of angle plates as described in claim 1, wherein each of said angle plates further comprises a plurality of projections proximate to said apex forming a space which receives and restrains said single tensioned strap from lateral movement along said legs.

10. The stacked package of angle plates as described in claim 9, wherein said apex of each of said angle plates further comprises a flat recess aligned with said plurality of projections, said flat recess and said space between said projections combining to receive and restrain said single tensioned strap at said apex of said angle plates.

11. The stacked package of angle plates as described in claim 1, wherein said single tensioned strap is located at said apex of each of said angle plates.

12. The stacked package of angle plates as described in claim 1, wherein said single tensioned strap is located along one of said legs of each of said angle plates in said stacked package.

13. The stacked package of angle plates as described in claim 1, wherein the number of angle plates is preselected from the group consisting of: (i) less than or equal to 25, (ii) less than or equal to 40 and (iii) less than or equal to 80.

14. The stacked package of angle plates as described in claim 13, wherein said single tensioned strap exerts a force of 4 foot pounds on said angle plates.

15. The stacked package of angle plates as described in claim 1, wherein said strap exerts a force of 4 foot pounds on said angle plates.

16. The stacked package of angle plates as described in claim 1, wherein each of said angle plates further comprises at least one of:
(i) a raised perimeter along a portion of at least one of: said legs and said corner; and
(ii) a plurality of projections proximate to said apex forming a space which receives and restrains said single tensioned strap from lateral movement along said legs; and
wherein at least one of said projections and said raised perimeter of each of said angle plates retards nesting of said angle plates.

17. The stacked package of angle plates as described in claim 1, wherein said single tensioned strap is further comprised of plastic material.

18. The stacked package of angle plates as described in claim 17, wherein said plastic material is linear and formed into a loop by a weld.

19. The stacked package of angle plates as described in claim 18, wherein said weld is formed by overlapping ends of said single tensioned strap and one end extends beyond said weld to form a tab facilitating destruction of the weld.

20. The stacked package of angle plates as described in claim 18, wherein the location of said weld on said stack is preselected from the group consisting of the: top and side of the stack.

21. The stacked package of angle plates as described in claim 17, wherein said plastic material resists stretching.

22. The stacked package of angle plates as described in claim 1, wherein said strap zone is generally aligned with an opening in a supply hopper provided to receive and restrain said stacked package, facilitating access to said single tensioned strap from outside of said supply hopper.

* * * * *